United States Patent [19]

Hwa et al.

[11] 3,959,167

[45] May 25, 1976

[54] METHOD AND COMPOSITION OF INHIBITING SCALE

[75] Inventors: Chih Ming Hwa, Palatine; Dionisio Guerrero Cuisia, Chicago; Murrell Leon Salutsky, Highland Park, all of Ill.

[73] Assignee: Chemed Corporation, Cincinnati, Ohio

[22] Filed: Dec. 10, 1973

[21] Appl. No.: 423,610

[52] U.S. Cl. ......................... 252/180; 252/DIG. 11; 252/DIG. 17
[51] Int. Cl.$^2$ ............................................. C02B 5/02
[58] Field of Search ...... 252/180, 86, 389, DIG. 11, 252/DIG. 17

[56] References Cited
UNITED STATES PATENTS

| | | | |
|---|---|---|---|
| 3,234,124 | 2/1966 | Irani | 252/175 |
| 3,505,238 | 4/1970 | Ziddell | 252/180 |
| 3,524,811 | 8/1970 | Tsuk et al. | 252/181 |
| 3,666,664 | 5/1972 | Lorene et al. | 252/180 |
| 3,671,448 | 6/1972 | Kowalski et al. | 252/180 |

*Primary Examiner*—Mayer Weinblatt
*Assistant Examiner*—Edith R. Buffalow
*Attorney, Agent, or Firm*—Eugene M. Bond

[57] ABSTRACT

The invention disclosed relates to a method for using a new improved composition for inhibiting or preventing accumulation of scale or the like on heating surfaces in an aqueous system. The present composition includes an acrylic polymer, a water-soluble chelant, and an organophosphonic acid and/or their water-soluble salts. In a preferred embodiment, the composition is composed of sodium polymethylacrylate, nitrilotriacetic acid and hydroxyethylidene diphosphonic acid as its water-soluble salts.

12 Claims, No Drawings

METHOD AND COMPOSITION OF INHIBITING SCALE

This invention relates to a method for using a new improved composition for preventing accumulation of scale in aqueous systems. More specifically, the present invention provides a method wherein only relatively small quantities of the new improved composition are used for effectively preventing formation of scale and sludge deposits in steam generating boilers.

It is well known in the art that formation of scale and sludge deposits on heating surfaces is one of the most serious problems encountered in boiler operations. External softening partially removes from the boiler feedwater some scale-forming substances. To combat scale-forming tendency of entrained impurities such as calcium and magnesium salts, and iron, internal chemical treatment is applied in boiler water in most industrial boilers. The chemical treatment of boiler water generally requires the combined used of a precipitating agent and a sludge conditioner to maintain the boiler sludge in a fluid form for effective removal. The precipitating chemicals commonly employed for calcium salts are soda ash and the sodium phosphates, e.g., disodium phosphate, trisodium phosphate, and sodium meta phosphate. Magnesium is precipitated by the alkalinity of the boiler water as magnesium hydroxide. The precipitate or sludge, which is made non-sticky and easily manageable by the addition of a sludge conditioner, is periodically removed from the boiler through the blowdown.

Prior to the present invention, a number of material such as tannin, lignins, starches, polyacrylates and polymethacrylates were used as sludge conditioners. However, the results have not been completely satisfactory. Accordingly, by practice of the present invention, an improved sludge conditioning composition has been found, which is capable of preventing and controlling scale from a steam generating boiler. The improved sludge conditioning composition consists of sodium polymethacrylate, nitrilotriacetic acid and hydroxyethylidene diphosphonic acid in the preferred composition while in also useful compositions, the hydroxyethylidene diphosphonic acid may be replaced by aminotrimethylenephosphonic acid or other hydroxyalkylidene diphosphonic acids. Nitrilotriacetic acid may be replaced by other water-soluble chelants.

Generally stated, the method of this invention for inhibiting or preventing accumulation of scale or the like in aqueous systems, includes adding to water flowing through the systems from about 0.01 to about 500 parts per million (p.p.m.) and preferably about 0.2 to about 50 parts per million of a mixture of an acrylic polymer, a water-soluble chelant and an organophosphonic acid as the water-soluble salts thereof. Preferably, the added composition is a mixture of sodium polymethylacrylate, nitrilotriacetic acid and hydroxyethylidene diphosphonic acid as the water-soluble salts thereof.

Although sodium polymethylacrylate is employed in the preferred composition, it is recognized that polymethacrylic acid, or other water-soluble salts of this polymer having a molecular weight within the range of from 1,000 to 1,000,000, calculated as the free acid, may be used. Polyacrylic acid or its water-soluble salts having a molecular weight within the range of from 1,000 to 1,000,000, calculated as the free acid, are also suitable.

Amino-trimethylenephosphonic acid is commercially available and is described in U.S. Pat. Nos. 3,234,124 and 3,298,956. Similarly, hydroxyalkylidene diphosphonic acids having the structural formula of:

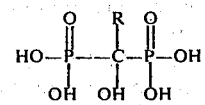

wherein R denotes an alkyl group having from 1 to 5 carbon atoms, are also suitable. Hydroxyethylidene diphosphonic acid is commercially available and is described in U.S. Pat. Nos. 3,214,454 and 3,297,578 by way of example. The water-soluble salts of these acids may be used and include such materials as the alkali metal, ammonium amine or lower alkanolamine salts.

Nitrilotriacetic acid is also well known and commercially available in the art. The water-soluble salts of nitrilotriacetic acid may be used. Ethylenediamine tetraacetic acid or its water-soluble salts are also suitable.

The following amounts of components forming the present compositions may be usefully employed herein:

| Ingredient | Parts per Weight General | Preferred |
| --- | --- | --- |
| Sodium Polymethacrylate | 0.1–100 | 2–6 |
| Nitrilotriacetic Acid | 0.1–100 | 0.5–2 |
| Amino-trimethylene-phosphonic Acid or Hydroxyethylidene Diphosphonic Acid | 0.1–100 | 0.5–2 |

Compositions used for treatment of aqueous systems may contain from 1 to 70 percent and preferably from 1 to 10 percent of the combinations disclosed by this invention. These solutions can be made by adding the ingredients to water in any order. These aqueous feed solutions are stable and can be stored prior to use. The compositions may be sold and used in the form of a dry powder or briquette or in the form of an aqueous solution containing from 50 to 99 percent by weight of water.

Compositions used in the practice of the present invention may also include other ingredients customarily employed in boiler water or cooling water treatments such as alkalies, lignin derivatives, biocides, corrosion inhibitors, etc. The point in the systems at which the treatment mixtures are added is not critical, however, it is customary to add them to the makeup or fresh water lines through which water enters the system.

The invention is further illustrated by the following specific but non-limiting examples, wherein all parts are given by weight unless otherwise indicated.

EXAMPLE 1

This example demonstrates the system used for determining the synergistic reduction in scaling rates obtained with the compositions of this invention.

Scale inhibiting evaluation was carried out in a small laboratory boiler having three removable electric heating tube surfaces. At the completion of a test, the heating tubes were removed individually from the boiler, the scale or deposit present on 6 inches of the central length of each tube was removed, by scraping, collected in a tared vial and weighed. When scaling tests are run using given feedwater and scale inhibitor present in the boiler water and with varying dosages of a given scale inhibitor, data is obtained as to how well the given reagent or reagents prevent scale deposition and also a comparison of scale inhibiting effectiveness of the subject reagents.

The small laboratory boiler used has been described previously in the proceedings of the Fifteenth Annual Water Conference, Engineers Society of Western Pennsylvania, pages 87–102 (1954). Boiler feedwater was prepared by diluting Lake Zurich, Illinois tap water with distilled water to 40 p.p.m. total hardness as $CaCO_3$, followed by adjustment to a 6 to 1 elemental calcium to magnesium ratio using calcium chloride. The boiler feedwater was fed to the boiler together with chemical treatment solutions containing sodium sulfate, sodium sulfite, sodium hydroxide, sodium chloride, treatment agents consisting of phosphate and scale inhibitors except in blank runs, in a ratio of 3 volumes of feedwater to 1 volume of chemical treatment solution, giving a feedwater total hardness of 30 p.p.m. as $CaCO_3$.

All scaling tests, whether scale inhibitor was present or absent (blank), were carried out in fixed manner as described following: Boiler blowdown was adjusted to 10% of the boiler feedwater, giving approximately 10 concentrations of the boiler water salines. Using the feedwater described, the composition of the chemical treatment solution was adjusted to give a boiler water (after the 10 concentrations) of the following composition:

TABLE I

| Ingredient | Taken as | Concentration (PPM) |
|---|---|---|
| Sodium Hydroxide | NaOH | 258 |
| Sodium Carbonate | $NaCO_3$ | 120 |
| Sodium Chloride | NaCl | 681 |
| Sodium Sulfite | $Na_2SO_3$ | 50 |
| Sodium Sulfate | $Na_2SO_4$ | 819 |
| Silica | $SiO_2$ | less than 1 |
| Iron | Fe | less than 1 |
| Phosphate | $PO_4$ | 10–20 |

All scaling tests were run for 43 hours each at a boiler pressure of 335 to 400 psig.

EXAMPLES 2–14

Using the procedure of Example 1, a series of runs were performed whereby the scale inhibiting properties of the synergistic mixture of sodium polymethacrylate, nitrilotriacetic acid, and hydroxyethylidene diphosphonic acid are illustrated:

TABLE II

| Ex. Run No. | Additive | Additive Dosage in Boiler Feedwater | Scaling Rate in gram per sq. ft. per hour | % Scale Reduction |
|---|---|---|---|---|
| 2 | Blank | None | 0.185 | 0 |
| 3 | Sodium polymethacrylate having a molecular weight of 4,500 (I) | 0.5 ppm | 0.145 | 21.6 |
| 4 | Nitrilotriacetic acid (II) | 0.5 ppm | 0.156 | 15.6 |
| 5 | Hydroxyethylidene diphosphonic acid (III) | 0.5 ppm | 0.148 | 20.0 |
| 6 | I + II + III (2:1:1 by weight) | 0.5 ppm | 0.010 | 94.5 |
| 7 | I | 1.0 ppm | 0.118 | 35.2 |
| 8 | II | 1.0 ppm | 0.108 | 41.6 |
| 9 | III | 1.0 ppm | 0.145 | 21.6 |
| 10 | I + II + III (2:1:1 active mixture) | 1.0 ppm | 0.004 | 97.8 |
| 11 | I | 2.0 ppm | 0.037 | 80.6 |
| 12 | II | 2.0 ppm | 0.094 | 50.1 |
| 13 | III | 2.0 ppm | 0.033 | 82.2 |
| 14 | I + II + III (2:1:1 active mixture) | 2.0 ppm | 0.000 | 100.0 |

EXAMPLES 15–19

While calcium and magnesium hardness in the feedwater are the most common scale forming materials in boilers, the presence of iron in the feedwater also constitutes another problem that causes boiler scale formation. Using the same feedwater in Example 1, but with the addition of high iron impurities in the feed, the synergistic behaviour of the mixture of sodium polymethacrylate, nitrilotriacetic acid and hydroxyethylidene diphosphonic acid is also illustrated in the following examples. The iron in the feedwater was 10 ppm as Fe.

| Example No. | Additives | Additive Dosage in the Feedwater | Scaling Rate in gram per sq. ft. per hour | % Scale Reduction |
|---|---|---|---|---|
| 15 | Blank | — | 0.275 | — |
| 16 | Sodium polymethacrylate having a molecular weight of 4,500 (I) | 3.0 ppm | 0.055 | 80.0 |
| 17 | Nitrilotriacetic acid (II) | 3.0 ppm | 0.270 | 1.8 |
| 18 | Hydroxyethylidene diphosphonic acid (III) | 3.0 ppm | 0.043 | 84.5 |
| 19 | I + II + III | | | |

-continued

| Example No. | Additives | Additive Dosage in the Feedwater | Scaling Rate in gram per sq. ft. per hour | % Scale Reduction |
|---|---|---|---|---|
| | (2:1:1 active mixture) | 3.0 ppm | 0.000 | 100.0 |

EXAMPLES 20-32

The boiler water sludge conditioning properties of the synergistic mixture of sodium polymethacrylate, nitrilotriacetic acid and amino trimethylenephosphonic acid are illustrated by the following non-limiting examples:

| Example No. | Additives | Additive Dosage in the Feedwater | Scaling Rate in gram per sq. ft. per hour | % Scale Reduction |
|---|---|---|---|---|
| 20 | Blank | — | 0.185 | — |
| 21 | Sodium polymethacrylate having a molecular weight of 4,500 (I) | 0.5 ppm | 0.145 | 21.6 |
| 22 | Nitrilotriacetic acid (II) | 0.5 ppm | 0.156 | 15.7 |
| 23 | Amino trimethylene phosphonic acid (IV) | 0.5 ppm | 0.105 | 42.0 |
| 24 | I + II + IV (2:1:1 active mixture) | 0.5 ppm | 0.067 | 64.0 |
| 25 | I | 1.0 ppm | 0.118 | 35.2 |
| 26 | II | 1.0 ppm | 0.108 | 41.6 |
| 27 | IV | 1.0 ppm | 0.074 | 59.1 |
| 28 | I + II + IV (2:1:1 active mixture) | 1.0 ppm | 0.033 | 82.1 |
| 29 | I | 2.0 ppm | 0.037 | 80.6 |
| 30 | II | 2.0 ppm | 0.094 | 50.1 |
| 31 | IV | 2.0 ppm | 0.040 | 78.2 |
| 32 | I + II + IV (2:1:1 active mixture) | 2.0 ppm | 0.000 | 100.0 |

EXAMPLES 33-37

Using the same feedwater in Example 1, but with the addition of high iron impurities in the feed (10 ppm as Fe), the synergistic behavior of the mixture of sodium polymethacrylate, nitrilotriacetic acid and amino trimethylenephosphonic acid is also illustrated in the following examples:

| Example No. | Additives | Additive Dosage in the Feedwater | Scaling Rate in gram per sq. ft. per hour | % Scale Reduction |
|---|---|---|---|---|
| 33 | Blank | — | 0.275 | — |
| 34 | Sodium polymethacrylate having a molecular weight of 4,500 (I) | 3.0 ppm | 0.055 | 80.0 |
| 35 | Nitrilotriacetic acid (II) | 3.0 ppm | 0.270 | 1.8 |
| 36 | Amino trimethylenephosphonic acid (IV) | 3.0 ppm | 0.090 | 67.2 |
| 37 | I + II + IV (2:1:1 active mixture) | 3.0 ppm | 0.000 | 100.0 |

EXAMPLES 38-42

The same experimental boiler described in Example 1 was used except that one of the three electric heating tubes was not used. The corresponding tube was unheated to simulate the colder tubes in boiler systems, such as downcomer tubes, equalizing tubes and internal feedline in actual boilers. The scale deposition on this cold surface tube was measured with and without the use of the treatment additive.

The boiler feedwater was prepared by diluting Lake Zurich, Illinois tap water with distilled water to 60 ppm total hardness as $CaCO_3$, followed by adjustment to a 1.67 to 1 elemental calcium to magnesium ratio using calcium chloride and/or magnesium chloride. The above boiler feed was fed to the boilers together with chemical treatment solutions (containing sodium sulfate, sodium sulfite, sodium hydroxide, sodium chloride, treatment agents consisting of phosphate and scale inhibitors except in blank runs) in a ratio of 3 volumes of feedwater to 1 volume of chemical treatment solution, giving a feedwater total hardness of 45 ppm as $CaCO_3$.

Adjustments of boiler water concentrations were carried out in a similar manner as in Example 1. The final boiler water composition after the 10 concentrations was practically the same as in Example 1.

All scaling tests were run for 45 hours each at a boiler pressure of 210 to 235 psig.

The scale inhibiting properties of the synergistic mixture of sodium polymethacrylate, nitrilotriacetic acid and amino trimethylenephosphonic acid for cold surfaces are illustrated by the following examples:

| Example No. | Additives | Additive Dosage in the Feedwater | Scaling Rate in gram per sq. ft. per hour | % Scale Reduction |
|---|---|---|---|---|
| 38 | Blank | None | 0.699 | — |
| 39 | Sodium polymethacrylate having a molecular weight of 4,500 (I) | 2.0 | 1.320 | (92.5)* |
| 40 | Nitrilotriacetic acid (II) | 2.0 | 0.427 | 38.9 |
| 41 | Amino trimethylenephosphonic acid (IV) | 2.0 | 0.366 | 46.6 |
| 42 | I + II + IV (2:1:1 active mixture) | 2.0 | 0.016 | 97.7 |

*Indicating an increase in scale over the blank.

The following compositions according to this invention show similar unexpected results for preventing accumulation of scale in aqueous systems.

EXAMPLE 43

Sodium polyacrylate having a molecular weight of 100,000 75.0%, trisodium nitrilotriacetate 12.5%, hydroxypropylidene diphosphonic acid 12.5%.

EXAMPLE 44

Polymethacrylic acid having a molecular weight of 400,000 50%, tetrasodium ethylenediamine tetraacetate 25%, hydroxyhexylidene diphosphonic acid 25%.

EXAMPLE 45

Potassium polymethacrylate having a molecular weight of 250,000 90%, disodium salt of nitrilotriacetic acid 6%, pentasodium salt of amino-trimethylenephosphonic acid 4%.

EXAMPLE 46

Polyacrylic acid having a molecular weight of 15,000 40%, ethylenediamine tetraacetic acid 30%, hydroxybutylidene diphosphonic acid 30%.

EXAMPLE 47

Potassium polyacrylate having a molecular weight of 7,000 80%, nitrilotriacetic acid 15%, hydroxypentylidene diphosphonic acid 5%.

EXAMPLE 48

Sodium polymethacrylate having a molecular weight of 450,000 6%, dipotassium salt of ethylenediamine tetraacetic acid 70%, disodium salt of hydroxyethylidene diphosphonic acid 24%.

EXAMPLE 49

Polymethacrylic acid having a molecular weight of 2,000 8%, trisodium nitrilotriacetate monohydrate 82%, tri-sodium salt of amino-trimethylenephosphonic acid 10%.

EXAMPLE 50

Polyacrylic acid having a molecular weight of 600,000 5%, hydroxyethyl ethylenediamine triacetic acid 8%, amino-trimethylenephosphonic acid 87%.

EXAMPLE 51

Sodium polymethacrylate having a molecular weight of 9,000 48%, disodium ethylenediamine tetraacetate dihydrate 27%, trisodium salt of hydroxypropylidene diphosphonic acid 25%.

EXAMPLE 52

Potassium polyacrylate having a molecular weight of 500,000 84%, trisodium nitrilotriacetate monohydrate 12%, hydroxyhexylidene diphosphoric acid 4%.

EXAMPLE 53

Sodium polymethacrylate having a molecular weight of 7,000 50%, trisodium nitrilotriacetate monohydrate 30%, ethylenediamine tetramethylenephosphonic acid 20%.

Obviously, many modifications and variations of the invention as hereinbefore set forth can be made without departing from the essence and scope thereof, and only such limitations should be applied as are indicated in the appended claims.

What is claimed is:

1. A method for inhibiting deposits of scale, sludge and other foulants in aqueous systems, said method consisting essentially of adding to the said systems of 0.01 to 500 parts per million of a mixture of 0.1 to 100 parts by weight of an acrylic polymer selected from the group consisting of polymethacrylic acid and polyacrylic acid and water-soluble salts thereof, said polymer having a weight average molecular weight of from about 1,000 to 1,000,000; 0.1 to 100 parts by weight of a water-soluble chelant selected from the group consisting of nitrilotriacetic acid and its water soluble salts, ethylenediamine tetraacetic acid and its water soluble salts; and 0.1 to 100 parts by weight of hydroxyalkylidene diphosphonic acid having the structural formula of

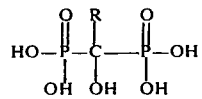

wherein R denotes an alkyl group having from 1 to 5 carbon atoms, and water-soluble salts thereof.

2. A method for inhibiting deposits of scale, sludge and other foulants in aqueous systems said method consisting essentially of adding to the said system from 0.01 to 500 parts per million of a mixture of 0.1 to 100 parts by weight of an acrylic polymer selected from the group consisting of polymethacrylic acid and polyacrylic acid and water-soluble salts thereof, said polymer having a weight average molecular weight of from about 1,000 to 1,000,000; 0.1 to 100 parts by weight of a water-soluble chelant selected from the group consisting of nitrilotriacetic acid and its water soluble salts, ethylenediamine tetraacetic acid and its water soluble salts and 0.1 to 100 parts by weight of amino-trimethylenephosphonic acid and its water-soluble salts.

3. A method for inhibiting deposits of scale, sludge and other foulants in aqueous systems, said method consisting essentially of adding to the said system from 0.01 to 500 parts per million of a mixture of 0.1 to 100 parts by weight of a polymethacrylic acid and water-soluble salts thereof, said polymer having a weight average molecular weight of from about 1,000 to 1,000,000; 0.1 to 100 parts by weight of nitrilotriacetic acid and water-soluble salts thereof; and 0.1 to 100 parts by weight of hydroxyethylidene diphosphonic acid and water-soluble salts thereof.

4. A method for inhibiting deposits of scale, sludge and other foulants in aqueous systems, said method consisting essentially of adding to the said system from 0.01 to 500 parts per million of a mixture of 0.1 to 100 parts by weight of polymethacrylic acid and water-soluble salts thereof, said polymer having a weight average molecular weight of from about 1,000 to 1,000,000; 0.1 to 100 parts by weight of ethylenediamine tetraacetic acid and water-soluble salts thereof; 0.1 to 100 parts by weight of hydroxyethylidene diphosphonic acid and water-soluble salts thereof.

5. A method for inhibiting deposits of scale, sludge and other foulants in aqueous systems, said method consisting essentially of adding to the said system from 0.01 to 500 parts per million of a mixture of 0.1 to 100 parts by weight of polymethacrylic acid and water-soluble salts thereof, said polymer having a weight average molecular weight of from about 1,000 to 1,000,000; 0.1 to 100 parts by weight of nitrilotriacetic acid and its water-soluble salts; 0.1 to 100 parts by weight of amino-trimethylenephosphonic acid and its water-soluble salts.

6. A method for inhibiting deposits of scale, sludge and other foulants in aqueous system, said method consisting essentially of adding to the said system from 0.01 to 500 parts per million of a mixture of 0.1 to 100 parts by weight of polymethacrylic acid and water-soluble salts thereof, said polymer having a weight average molecular weight of from about 1,000 to 1,000,000; 0.1 to 100 parts by weight of ethylenediamine tetraacetic acid and its water-soluble salts; and 0.1 to 100 parts by weight of amino-trimethylenephosphonic acid and its water-soluble salts.

7. The method of claim 1 wherein the acrylic polymer is present in an amount of 2–6 parts by weight, the chelant is present in an amount of 0.5–2 parts by weight and the diphosphonic acid is present in an amount of 0.5–2 parts by weight.

8. The method of claim 2 wherein the acrylic polymer is present in an amount of 2–6 parts by weight, the chelant is present in an amount of 0.5–2 parts by weight and the amino-trimethylenephosphonic acid and its water-soluble salts is present in an amount of 0.5–2 parts by weight.

9. The method of claim 3 wherein the polymethacrylic acid and water-soluble salts thereof is present in an amount of 2–6 parts by weight, the nitrilotriacetic acid and water-soluble salts thereof is present in an amount of 0.5–2 parts by weight and the hydroxyethylidene diphosphonic acid and water-soluble salts thereof is present in amount of 0.5–2 parts by weight.

10. The method of claim 4 wherein the polymethacrylic acid and water-soluble salts thereof is present in amounts of 2–6 parts by weight, the ethylenediamine tetraacetic acid and water-soluble salts thereof is present in an amount of 0.5–2 parts by weight, and the hydroxyethylidene diphosphonic acid and water-soluble salts thereof is present in an amount of 0.5–2 parts by weight.

11. The method of claim 5 wherein the polymethacrylic acid and water-soluble salts thereof is present in an amount of 2–6 parts by weight, the nitrilotriacetic acid and its water-soluble salts is present in an amount of 0.5–2 parts by weight and the amino-trimethylenephosphonic acid and its water-soluble salts is present in an amount of 0.5–2 parts by weight.

12. The method of claim 6 wherein the polymethacrylic acid and water-soluble salts thereof is present in an amount of 2–6 parts by weight, the ethylenediamine tetraacetic acid and its water-soluble salts is present in an amount of 0.5–2 parts by weight and the amino-trimethylenephosphonic acid and its water-soluble salts is present in an amount of 0.5–2 parts by weight.

\* \* \* \* \*